United States Patent Office 3,382,207
Patented May 7, 1968

3,382,207
FLAME-RETARDANT POLYCARBONATES
Donald B. G. Jaquiss, Lenox, Mass., assignor to General
Electric Company, a corporation of New York
No Drawing. Filed Sept. 30, 1965, Ser. No. 491,862
5 Claims. (Cl. 260—45.7)

ABSTRACT OF THE DISCLOSURE

A flame-retardant composition having in admixture a high ignition temperature polymer, which polymer ignites at a temperature in excess of 700° F., and at least 1.0 weight percent of a polyhalodiphenyl carbonate containing 6–10 halogen atoms and preferably the polyhalodiphenyl carbonate being decabromodiphenyl carbonate. The halogen atoms of the polyhalodiphenyl carbonate may be either bromine, chlorine, fluorine or iodine, or mixtures thereof.

---

This invention relates to new and novel compounds and in particular to flame retardant high ignition temperature polymer compositions containing the new and novel compounds.

Flame retardant thermoplastic materials are much desired and wanted, particularly in the ever increasing use of thermoplastics in home construction, home tools, etc. Some thermoplastics such as the polycarbonates ignite at temperatures far in excess of such other thermoplastics as for example, polystyrene and polyethylene. Even though there is a difference in the ignition temperature, a polycarbonate resin can support combustion beyond 20 seconds after ignition and subsequent removal of the igniting source and in particular thin sections. In some cases, a polycarbonate resin will even drip flaming particles so as to constitute a secondary source of ignition. Even though this appears to be a very short time period, this can be potentially dangerous in that surrounding combustible materials can be ignited in such a short period of time. To improve the flame retardant or flame-out property of high ignition temperature polymers so that they will not support combustion beyond a few seconds would be greatly wanted by the industry.

In the art of thermoplastics, many materials have been used as additives for imparting flame retardant properties to thermoplastics. Many of these additives are halogen containing compounds and have been successful in rendering thermoplastics flame retardant. It would seem that to merely increase the amount of these known additives would be sufficient to achieve the desired flame-retardant property wherein flame-out would occur in the matter of a few seconds. However, to achieve the desired flame-retardant property of such high ignition temperature polymers as for example a polycarbonate by using large quantities of these known flame retardants, diminution of the other desirable properties of the polymer results. In many instances, even increasing the amounts of the known flame-retardant compounds did not improve the flame-out property of the polycarbonate. Therefore, it would be most desirable to have not only an improved flame retardant high ignition temperature polymer composition but to have a composition wherein the other desirable properties of the base polymer are not lessened by the addition of the flame retardant agent.

Therefore, it is an object of this invention to provide novel compounds.

Another object of this invention is to provide improved flame-retardant, high-ignition-temperature polymer compositions.

Still another object of this invention is to provide a process for preparing the novel compounds of this invention.

Other objects and advantages of this invention will become apparent from the following detailed description thereof.

Briefly, according to this invention, the foregoing and other objects are attained by uniformly blending with a high ignition temperature polymer such as a polycarbonate, particular polyhalodiphenyl carbonates in order to provide improved, undegraded, flame retardant polycarbonate compositions.

The following examples are set forth to illustrate more clearly the principle and practice of this invention to those skilled in the art. Unless otherwise expressed, where parts are mentioned, they are parts by weight.

EXAMPLE I 53.2 parts of pentachlorophenol are dissolved in 500 ml. of water containing 8.0 parts of sodium hydroxide and 1 part of pyridine. The solution is treated with 10 parts of phosgene over a period of 10 minutes. The pH is then adjusted to about 3 which results in coagulation of the fine particles. The coagulated material is filtered off, washed with water and dried.

The resulting product is decacholordiphenyl carbonate.

EXAMPLE II 97.8 parts of pentabromophenol are dissolved in 200 ml. of water containing 8.4 parts of sodium hydroxide and 1 part of pyridine. The solution is treated with 10 grams of phosgene over a period of 10 minutes. A heavy precipitate forms which is filtered off, washed with water and dried.

The resulting product is decabromodiphenyl carbonate.

EXAMPLE III

Exhibit II is repeated except that in place of the pentabromophenol, tetrafluorophenol is used.

The resulting product so obtained is octafluorodiphenyl carbonate.

EXAMPLE IV

Exhibit II is repeated except that in place of pentabromophenol, 2,4,6-triiodophenol is used.

The resulting compound so obtained is hexaiododiphenyl carbonate.

EXAMPLE V 100 grams of pentabromophenol are dissolved in 250 ml. of pyridine. A clear tan solution is obtained which is heated to about 45° C. The solution is treated with phosgene at the rate of 0.5 gram per minute. A thick slurry is obtained which is cooled to room temperature and poured into water. A heavy precipitate forms which is filtered and washed with water.

The resulting product obtained is decabromodiphenyl carbonate.

EXAMPLE VI

The decabromodiphenyl carbonate prepared in Example II above is blended with an aromatic polycarbonate powder, which aromatic polycarbonate is prepared by the reaction of bisphenol-A and phosgene. The amount employed is about 5 weight percent based on the weight of the total composition. The mixture, after drying, is extruded at 500° F. and pelletized. The pellets are injection molded into sample bars of 2½ x 1½ x ⅛″. These samples are designated as A.

As a control, the polycarbonate composition as described above, without the decabromodiphenyl carbonate additive is prepared and pelletized in the same fashion. It is injection molded into sample bars of the same size. These samples are designated as B.

To test the flame retardant or flame out properties of the above samples, the test bars are suspended with the long axis thereof in a vertical plane and with the lower end of the bar slightly above the tip of the blue cone of a Bunsen burner in an ignition cabinet. After 15 seconds in this position, the burner is removed and the door of the ignition cabinet closed. The flame out time, which is that time from removal of the Bunsen burner after ignition of the sample to flame out is noted. Test samples containing the decabromodiphenyl carbonate additive have an average flame out time of about 2 seconds. The average flame out time of the control samples containing no additives is in excess of 20 seconds.

This example clearly shows that with the use of decabromodiphenyl carbonate, the composition is almost instantaneously self-extinguishing in comparison to a polycarbonate containing no additive.

This invention is directed to new and novel polyhalodiphenyl carbonates and to high ignition temperature polymer compositions comprising in admixture, a high ignition temperature polymer and a particular polyhalodiphenyl carbonate. The high ignition temperature polymer compositions of this invention have improved flame retardant properties. In addition, the excellent physical and chemical properties of the high ignition polymer are not degraded or lessened by the particular polyhalodiphenyl carbonate employed in combination therewith. Specifically, the novel compounds of this invention are polyhalodiphenyl carbonates containing specific numbers of certain specific halogen atoms, which halogen atoms can be either 9–10 bromine atoms, 6–10 fluorine atoms, 6–10 iodine atoms or mixtures thereof, or mixtures thereof with at least one chlorine atom. The preferred polyhalodiphenyl carbonate of this invention is decabromodiphenyl carbonate having the following chemical formulation:

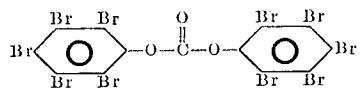

As stated above, this invention is also directed to an improved flame retardant, high ignition temperature polymer compositions which have in admixture a high ignition temperature polymer and at least 1.0 weight percent of a particular polyhalodiphenyl carbonate. The polyhalodiphenyl carbonates employed herein to render the high ignition temperature polymers flame retardant contains 6–10 halogen atoms and preferably 8–10 halogen atoms, which halogen atoms are either bromine, chlorine, fluorine or iodine. In the practice of this invention, the preferred high ignition temperature polymer composition contains 1–10 weight percent of the particular polyhalodiphenyl carbonate based on the weight of the total composition.

In the practice of this invention, high ignition temperature polymers as used and defined herein means those thermoplastic polymers which have ignition temperatures in excess of 700° F. Ignition temperature means that temperature at which the thermoplastic polymer will ignite as determined by Setchkin's ignition test. The complete description and procedure is given in ASTM D–1929–62T and is incorporated herein. Briefly, this test consists of placing in an electrically heated furnace tube a three-gram sample of the material to be tested which is exposed to a standard condition of air flow through the furnace. The furnace is equipped with thermocouples to indicate that temperature at which ignition of the sample occurs. The form of the sample can be either powder, pellets or ground up molded parts. In the test described above, to determine the ignition temperature of the polymers employed herein, the form of the test material is pellets. As determined by the Setchkin test, and as defined by the temperature limitation above, high ignition temperature polymers having ignition temperatures in excess of 700° C. consist of such polymers as polycarbonates, polyphenylene oxides, polysulfones, polybenzimidazoles, etc. or mixtures thereof. However, as employed herein, the preferred high ignition temperature polymer is a polycarbonate.

Any of the polycarbonates can be employed herein in the practice of this invention. However, particularly useful are the aromatic polycarbonates prepared by reacting a dihydric phenol, such as bisphenol-A, with a carbonate precursor. The carbonate precursor may be either a carbonyl halide, a carbonate ester or a haloformate. The carbonyl halides which can be employed herein are carbonyl bromide, carbonyl chloride, carbonyl fluoride, etc., or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bishaloformates of dihydric phenols (bischloroformates of hydroquinone, etc.) or glycols (bis-haloformates of ethylene glycol, neopentyl glycol, polyethylene glycol, etc.). While other carbonate precursors will occur to those skilled in the art, carbonyl chloride, also known as phosgene, is preferred.

As stated previously, the flame retardant high ignition temperature polymer composition of this invention consists of in admixture, a high ignition temperature polymer and a polyhalodiphenyl carbonate. The polyhalodiphenyl carbonates which can be employed in the practice of this invention include such materials as hexabromodiphenyl carbonate, decabromodiphenyl carbonate, hexachlorodiphenyl carbonate, decachlorodiphenyl carbonate, hexafluorodiphenyl carbonate, hexaiododiphenyl carbonate, pentabromo-pentachlorodiphenyl carbonate, etc., and mixtures thereof. The particular polyhalodiphenyl carbonate to be employed with the high ignition temperature polymer is decabromodiphenyl carbonate or decachlorodiphenyl carbonate. It is interesting to note that the above polyhalodiphenyl carbonates are materials which have high vapor pressures in the range of the ignition temperatures of the polymers.

As stated previously, the instant application is directed to particular novel polyhalodiphenyl carbonates containing certain specific halogen atoms. The process for preparing such materials comprises reacting a polyhalophenol with phosgene in a reaction medium which may be either a tertiary amine organic solvent medium or an aqueous medium. When using a tertiary amine organic solvent, the polyhalophenol is soluble therein producing a single phase solution. The single phase solution is then treated with phosgene to form the polyhalodiphenyl carbonate. The aqueous medium can be either an earthalkali or alkali bicarbonate, carbonate or hydroxide and can be either a solution or a slurry thereof. However, when employing an aqueous medium, it is necessary to employ a catalyst. The catalysts which can be used herein are tertiary amines such as trimethyl amine, triethyl amine, tripropyl amine, tributyl amine, methyl ethyl amine, dimethyl ethyl amine, quinoline, isoquinoline, etc. or mixtures thereof, or quarternary salts such as $NR_4Cl$, i.e. tetramethyl ammonium chloride, trimethyl ammonium propyl iodide, benzyl trimethyl ammonium iodide, etc. or mixtures thereof. The amount of catalyst used can vary from 0.01–2.0 weight percent thereof based on the weight of the polyhalophenol. The earthalkali and alkali salts must be present in at least stoichiometric amounts.

The tertiary amine organic solvents which can be employed to prepare solutions of the polyhalophenol include such solvents as triethyl amine, tripropyl amine, pyridine, quinoline, etc. and mixtures thereof. Of course no additional catalyst is needed when employing the tertiary amine organic solvents.

As set forth previously, the novel compounds of this invention have excellent use as flame retardant additives for high ignition temperature polymers without adversely affecting the other desirable properties of the high ignition temperature polymer.

It will thus be seen that the objects set forth above, among those made apparent from the preceding description, are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A flame retardant high ignition temperature polymer composition comprising in admixture a thermoplastic polymer having an ignition temperature in excess of 700° F. and at least 1.0 weight percent of a polyhalodiphenyl carbonate containing 6–10 halogen atoms based on the weight of the high ignition temperature polymer composition; said halogen atoms being selected from the group consisting of bromine, chlorine, fluorine and iodine, and mixtures thereof.

2. The composition of claim 1 wherein the polyhalodiphenyl carbonate is 1.0–10.0 weight percent based on the weight of the high ignition temperature polymer composition.

3. The composition of claim 1 wherein the polyhalodiphenyl carbonate is decarbromodiphenyl carbonate.

4. The composition of claim 1 wherein the polyhalodiphenyl carbonate is decachlorodiphenyl carbonate.

5. The composition of claim 1 wherein the high ignition temperature polymer is an aromatic polycarbonate.

References Cited

UNITED STATES PATENTS

| | | | |
|---|---|---|---|
| 3,274,156 | 9/1966 | Perry | 260—45.7 X |
| 3,285,965 | 11/1966 | Jenkner | 260—45.7 X |

DONALD E. CZAJA, *Primary Examiner.*

M. J. WELSH, *Assistant Examiner.*